(12) United States Patent
Collins

(10) Patent No.: US 6,848,743 B1
(45) Date of Patent: Feb. 1, 2005

(54) SANITARY SHOPPING CART SEAT COVER

(76) Inventor: Janna Collins, P.O. Box 22302, Carson City, NV (US) 89721

( * ) Notice: Subject to any disclaimer, the term of this patent is extended or adjusted under 35 U.S.C. 154(b) by 0 days.

(21) Appl. No.: 10/658,210

(22) Filed: Sep. 9, 2003

(51) Int. Cl.⁷ .............................................. A47D 13/08
(52) U.S. Cl. ........................... 297/256.17; 297/219.12; 297/229
(58) Field of Search ........................... 297/256.17, 229, 297/219.12, 219.1

(56) References Cited

U.S. PATENT DOCUMENTS

| | | | | |
|---|---|---|---|---|
| 4,655,502 A | * | 4/1987 | Houllis | 297/229 |
| 5,238,293 A | * | 8/1993 | Gibson | 297/229 |
| 5,678,888 A | * | 10/1997 | Sowell et al. | 297/256.17 |
| 5,829,835 A | * | 11/1998 | Rogers et al. | 297/256.17 |
| 5,855,412 A | * | 1/1999 | Smith et al. | 297/256.17 |
| 5,897,165 A | * | 4/1999 | Kucharczyk et al. | 297/256.17 |
| 6,428,098 B1 | * | 8/2002 | Allbaugh | 297/219.12 |
| 6,676,210 B1 | * | 1/2004 | Peyton | 297/219.12 |
| 2003/0205922 A1 | * | 11/2003 | Norman | 297/256.17 |
| 2003/0227202 A1 | * | 12/2003 | Endicott et al. | 297/256.17 |

* cited by examiner

Primary Examiner—Peter R. Brown
(74) Attorney, Agent, or Firm—Donald W. Meeker

(57) ABSTRACT

A padded sanitary shopping cart child seat cover with storage pockets, a toy securing device and a four point securing system, which includes a safety belt that secures the cover and the child to the seat in the shopping cart.

5 Claims, 3 Drawing Sheets

SANITARY SHOPPING CART SEAT COVER

BACKGROUND OF THE INVENTION

1. Field of the Invention

The present invention relates to a protective sanitary cover and more particularly relates to a protective cover that provides insulation and comfort and also shields children from germs and dirt that may be found on shopping carts, high chairs, and similar publicly used seating devices and includes a safety belt which secures the cover and the child to the seat in the shopping cart

2. Description of the Prior Art

Placing infants or young children in the child seats of public shopping carts presents the problems of sanitation and comfort. Shopping carts, high chairs or infant seats provided by supermarkets, restaurants or shopping malls are used by the public. Generally, these devices are not washed or disinfected between uses. Because of the repeated use of these devices by the public, these devices present problems of sanitation. Germs left as a result of the repeated use can easily be passed to the child occupant as a result of the child coming in contact with the shopping cart, car seat, public high chair, or publicly used strollers. Covering the cart seat and all surrounding areas form contact with the child is desirable. Securing a covering to the cart is a problem. Securing the child in the seat of the cart is also a safety concern. Prior art devices do not adequately address these problems.

Prior art U.S. Pat. No. 5,238,293, issued Aug. 24, 1993 to Gibson, provides a cover for the seat of a shopping cart. The cover comprises a sheet of double quilted material that has a first rectangular panel located at the rear end of the sheet. The bottom surface of the sheet is provided with at least one fastener strip adjacent to the rear edge of the first rectangular panel and at least one additional fastener strip spaced from the first mentioned fastener strip such that the first rectangular panel can be folded along a line which is located between the first fastener strip and the second fastener strip around the handle of the shopping cart so that the first and second fastener strips can engage one another to hold the first rectangular panel around the handle of the cart. The forward end of the sheet has a second rectangular panel and a central panel that extends between the first and second rectangular panels. The forward end is provided with an elastic strip, the second rectangular panel is folded downwardly and beneath the central panel along a fold line where the central panel connects with the second rectangular panel. The vertical side edges of the second rectangular panel are stitched to the bottom surface of the central panel. The folded-back and stitched second rectangular panel forms a pocket, which is received over a portion of the cart on a pivotal back member that folds away from the handle portion of the shopping cart.

Prior art U.S. Pat. No. 6,237,998, issued May 29, 2001 to Aprile, shows a shopping cart seat cover that has body made from flexible sheet material. The seat cover has a front panel, a handle fold at the upper portion of the front panel, and an interior seat liner panel extending from the front panel at the handle fold. The interior seat liner panel has right and left child leg apertures in the front portion of the interior seat liner panel, a rear seat basket fold at the back of the interior panel, and a rear flap extending from the interior panel at the rear seat basket fold. The interior panel includes a plurality of aperture closure flaps extending across a left leg aperture and a plurality of aperture closure flaps extending across a right leg aperture of the interior panel. The interior panel further includes right and left shopping cart side rail cover flaps. The shopping cart seat cover includes left and right side shopping cart handle covers. A safety strap extends through the right and left safety flap apertures of the rear flap. The safety strap has a clasp located in between the interior panel and the rear flap. A child foot shield storage pouch extends downwardly from the front panel. The storage pouch has an interior volume that is sufficiently large to accommodate the shopping cart seat cover body.

Prior art U.S. Pat. No. 4,655,502, issued Apr. 7, 1987 to Houllis, puts forth a foldable seat cushion that has at least one blank for use in the seat basket of a shopping cart. The device is constructed so that the back portion of the seat cushion can be adjusted for the width of the seat basket and affixed in position thereupon, while the front portion of the seat cushion may be rolled about the handle of the shopping cart and secured with an adjustable fastener. The invention includes a pair of apertures provided for legs of the child through the seat cushion, a seat belt for retention of the infant therein and accessory tethering straps for the application of toys or like objects for the entertainment of the child while seated upon the seat cushion.

Prior art U.S. Pat. No. 5,678,888, issued Oct. 21, 1997 to Sowell, illustrates a shopping-cart child-seat cover, which is made from pliable material and has a seat section, a back section, a front section and two side sections. The seat section of the child-seat cover is sized and shaped to fit on top of a seat bottom of a child-seat portion of a shopping cart. Cover fasteners are positioned on portions of the back section of the child-seat cover at which a portion of the back section that is positioned against a back wall of the child seat engages a container-side portion of the back section that hangs down from over a top of the back wall of the child seat. In like manner, cover fasteners are positioned on portions of the front and side sections of the child-seat cover at which a portion of the front section that is positioned against a front wall of the child seat engages an outside portion of the front section that hangs down from over a top of the front wall of the child seat and at which portions of the side sections that are positioned against side walls of the child seat engage outside portions of the side sections that hang down from over tops of the side walls of the child seat. The pliable material is designedly washable, soft and thickly cushioned. Optional features, including a safety seat belt, bottle holder, toy holders and cushion, are provided.

Prior art U.S. Pat. No. 6,129,417, issued Oct. 10, 2000 to Cohen-Fyffe, describes a shopping cart clean seat for use as a seat cover. The shopping cart clean seat made of a thin sheet of flexible material having a front sleeve and a back sleeve to secure the seat cover to the child seating area of the shopping cart. Front and back portions connect the front and back sleeves to a central bottom portion, side portions extend from the central bottom portion, and the portions together cover the child seating area of the shopping cart, respectively. The shopping cart clean seat has piping at the seams of the portions to retain its shape. The front portion of the clean seat has openings for the child's legs to pass through. The back portion of clean seat has grommet openings for a belt to pass through to retain the child.

Prior art U.S. Pat. No. 6,036,264, issued Mar. 14, 2000 to Lucree, puts forth a sanitary liner for a shopping cart infant seat, which consists of a seat area shaped to fit within the shopping cart infant seat area, a flexible rim stitched to the top of the seat area and encircling the seat area, a narrow, flat, steel wire stitched to the bottom side of the rim and located between the outer edge and the seat area and encircling the seat area. A strap with a loop, chain, and hook is stitched to the bottom of the seat area for fastening to the shopping cart, and a plurality of straps stitched to the flexible rim bottom side for securing the liner within the shopping cart infant seat.

Prior art U.S. Pat. No. 6,206,471, issued Mar. 27, 2001 to McGowan, discloses a foldable cushion safety seat, manufactured from durable fabric and foam, that would be placed into the seat area of any standard shopping cart. The present invention would be secured to the cart by two VELCRO™ tabs and an incorporated handle bar cushion extending from the front of the seat when attached to the handle of the cart by a pair of VELCRO™ tabs also. The device would feature an adjustable nylon strap that, once a child would be placed in the seat, would secure the child in place. A short length of the nylon strap would be attached to the upper section of the safety seat. Once a child would be placed onto the lower section of the safety seat, the strap would then be tightened around the child's mid-section as needed. A replaceable and detachable child guard would protect the cushioned seat from stains. A pocket on the back portion of the seat would provide storage for a milk bottle, and two pockets on the opposite end of the back portion would provide miscellaneous storage for toys, coupons, or other small items.

Prior art U.S. Patent Application #20010048235, published Dec. 6, 2001 by Hartranft, illustrates cover for child safety seats particularly those attached to shopping carts, which preferably comprises a rectangular padded section and a similarly configured rectangular liner section of liquid impervious material. The padded section consists of a central rectangular section and rear, front, and side flap sections for securing the cover to the child seat, and preferably has an aperture for receiving a restraining strap or belt attached to a child safety seat, padded covers for the safety straps of the seat, and the rear and side flap sections are fitted with external pockets designed for receipt of personal items of the infant, small child, or parent or guardian.

Prior art U.S. Pat. No. 6,129,418, issued Oct. 10, 2000 to Bergh, discloses a cushion for a shopping cart seat that provides a child riding in a shopping cart seat with a comfortable, safe, sanitary and entertaining environment. The cushion easily envelopes all surrounding areas of the shopping cart seat, giving complete coverage over the handle, seat, sides, top edges and back, and includes an attached pouch for storing the cushion. The pouch has a sealable opening, and is optionally provided with entertainment features.

Prior art U.S. Pat. No. 5,967,606, issued Oct. 19, 1999 to Bergh, indicates a universal, adaptable shopping cart cushion that easily envelopes all surrounding areas of the shopping cart seat, which gives complete coverage over the handle, seat, sides, top edges and back. The adjustable perimeter seam allows easy adaptability to various size shopping carts. This cushion provides a child riding in a shopping cart seat, with a comfortable, safe, and sanitary environment. Safety seat belts are installed for the child's safety and security and an adjustable perimeter seam simplifies and expedites the installation and removal of the cushioned cover. An elastic strap secures the cushion when rolled for easy, compact storage. Sanitation is maintained by an easy, washable material and design. The cushion provides protection from being pinched, scratched or harmed by the hard movable shopping cart seat and protection from the results of various weather conditions.

Prior art U.S. Pat. No. 5,855,412, issued Jan. 5, 1999 to Smith, concerns a combination shopping cart seat cushion and diaper bag, which includes a substantially rectangular seat panel with foldable front, back and two side panels depending therefrom. A foldable top panel depends from the back panel. The panels may be folded from a flat position to form a box shaped diaper bag. The front panel may be folded downward and the top panel may be folded over a shopping cart seat backrest to form a shopping cart seat cushion. An accessory panel may be removably attached to either the top or the back panels using VELCRO™ strips or other suitable attachment means. A seat/diaper changing cushion may be removably attached to the upper surface of the seat panel when the device is being used as a shopping cart seat cushion providing additional comfort to a child sitting therein. An elongated, tubular shopping cart handle cover is also provided having a longitudinal slit for slipping the cover over a shopping cart handle and a longitudinal bore therethrough for receiving said shopping cart handle.

Prior art U.S. Pat. No. 5,330,250, issued Jul. 19, 1994 to Reyes, is a liner apparatus that supports a seated infant in a shopping cart. Side members comfortably support the infant in an upright position while allowing the infant to move his head and arms freely. The backrest is padded and made of a flexible material that conforms to an infant's posture when seated. The base is padded and has an extension providing additional comfort to the infant's legs when seated. An attachment strap holds the liner into the child seat, while a restraining strap holds the child within the liner. The upper portion of the backrest folds down for easy storage and transportation of the liner when not in use. The liner is specifically configured to work cooperatively with the wire basket construction of a shopping cart that has protruding wires, which provide discomfort to a child sitting within the child seat without a liner.

Prior art U.S. Pat. No. D465,959, issued Nov. 26, 2002 to Cameron, shows the ornamental design for a highchair protective cover.

Prior art U.S. Pat. No. D342,835, issued Jan. 4, 1994 to Mink, claims the ornamental design for a child seat for use on a shopping cart.

Prior art U.S. Pat. No. 5,547,250, issued Aug. 20, 1996 to Childers, indicates a cushioned seating device to be used in conjunction with a shopping cart of the type including a grill frame with a front wall and a rear wall, and an end panel that is pivotally secured to the rear wall and a collapsible seat with a horizontal seat member and a back rest. The seating device comprises a central padded portion that has a first end and a second end. A padded end panel cover portion extends from the first end of the central padded portion. A padded seat back portion extends from the second end of the central padded portion. The seat back portion has a first section hingedly connected to a second section. A pair of wing members extend from opposing sides of the second section of the seat back portion. The wing members are positioned around the child and are fastened to one another so that the child's torso is firmly secured against the backrest portion of the shopping cart.

What is needed is a sanitary cover for shopping carts which is comfortable, covers all areas of contact of the cart by the child, is secured to the cart to stay in place and provides a seat belt to secure the child on the cover in the seat.

SUMMARY OF THE INVENTION

An object of the present invention is to provide a sanitary cover for shopping carts which is comfortable, covers all areas of contact of the cart by the child, is secured to the cart to stay in place and provides a seat belt to secure the child on the cover in the seat.

Another object of the present invention is to provide seat belt that is attached to the sanitary cover so a parent does not need to rely on a safety belt being provided by the shopping cart.

One more object of the present invention is to provide a sanitary cover for a shopping cart that is structured to cover all areas of the cart the child can touch, thereby preventing them from coming into contact with the germs and dirt that cover shopping carts, which is easy to install.

An additional object of the present invention is to provide a sanitary cover for the child seat of a shopping cart that has two large storage pockets located on the side flaps, which are out of sight and reach of the child.

A further object of the present invention is to provide a sanitary cover that is secured to the shopping cart in four areas: the front handle cover, each side flap, which attaches to the cart using elastic loops and buttons; and the seat belt, which runs through an open area of the shopping cart seat back and through one of the seat belt receiving openings in the back support portion of the cover and around the child to hold the child in the cart child seat and retain the back overlap portion in place.

A contributory object of the present invention is to provide a sanitary shopping cart cover that is completely machine washable, which has a top that is 100% cotton, a bottom made of a cotton/polyester blend and internal polyester batting.

An added object of the present invention is to provide a sanitary cover for a shopping cart seat that when not in use, folds to look like a small blanket and fits easily under the seat or in the trunk of a car.

An ensuing object of the present invention is to provide a sanitary cover that fits in all shopping carts, including the double-wide shopping carts at warehouse stores, and may also be used in restaurant highchairs, public strollers, public infant seats, rental car seats or other similar publicly used seating devices.

An ancillary object of the present invention is to provide a sanitary shopping cart seat cover that provides cozy, fun fabrics and a toy attachment means, which comprises two snap on cords in the front for attachment of baby's toys or pacifiers, to keep a child comfortable and entertained while their parent is shopping.

In brief, a sanitary cover for a child seat on a shopping type cart provides complete coverage of all parts of the cart which could be contacted by the child, provides padding for the comfort of the child, provides means for attaching playthings for the child which cannot fall to the floor, provides pockets for storage, and provides a seat belt which attaches to an end of a child back support portion of the cover which folds over the backrest of the child seat on the shopping cart, the seat belt running through openings in the shopping cart seat back through narrow belt openings in the back support portion of the cover and around the child to hold the child in and retain the back of the seat cover in place and the entire cover on the shopping cart seat.

An advantage of the present invention is that it provides a barrier from germs and dirt.

Another advantage of the present invention is that it is padded for the child's comfort.

An additional advantage of the present invention is that it provides storage pockets that are out of the child's reach.

One more advantage of the present invention is that it can keep the child's playthings from falling to the ground.

Yet another advantage of the present invention is that it is very securely attached to the shopping cart.

Still another advantage of the present invention is that it secures the child and the cover to the shopping cart.

One more advantage of the present invention is that the safety belt is attached to the cover.

A further advantage of the present invention is that it can be used on any shopping cart or public infant seat.

Another advantage of the present invention is that it is machine washable.

Still another advantage of the present invention is that it stores compactly when not in use.

A corollary advantage of the present invention is that it is easy to install.

Yet another advantage of the present invention is that it is inexpensive to manufacture.

BRIEF DESCRIPTION OF THE DRAWINGS

These and other details of my invention will be described in connection with the accompanying drawings, which are furnished only by way of illustration and not in limitation of the invention, and in which drawings.

BEST MODE FOR CARRYING OUT THE INVENTION

Figure 1:
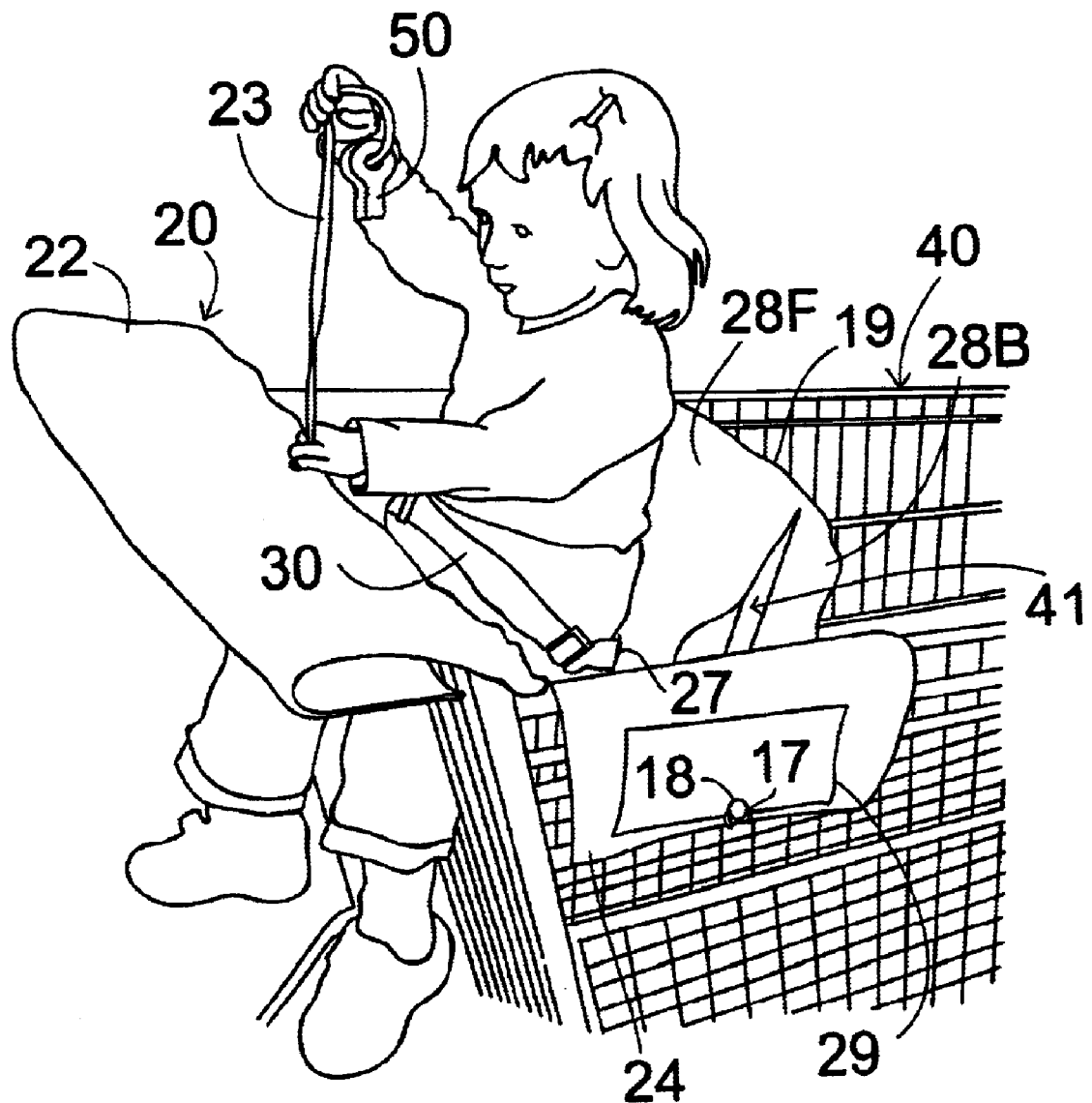
FIG. 1 is a perspective view of the sanitary shopping cart seat cover of the present invention mounted on a shopping cart with a child in the seat.
Figure 2:
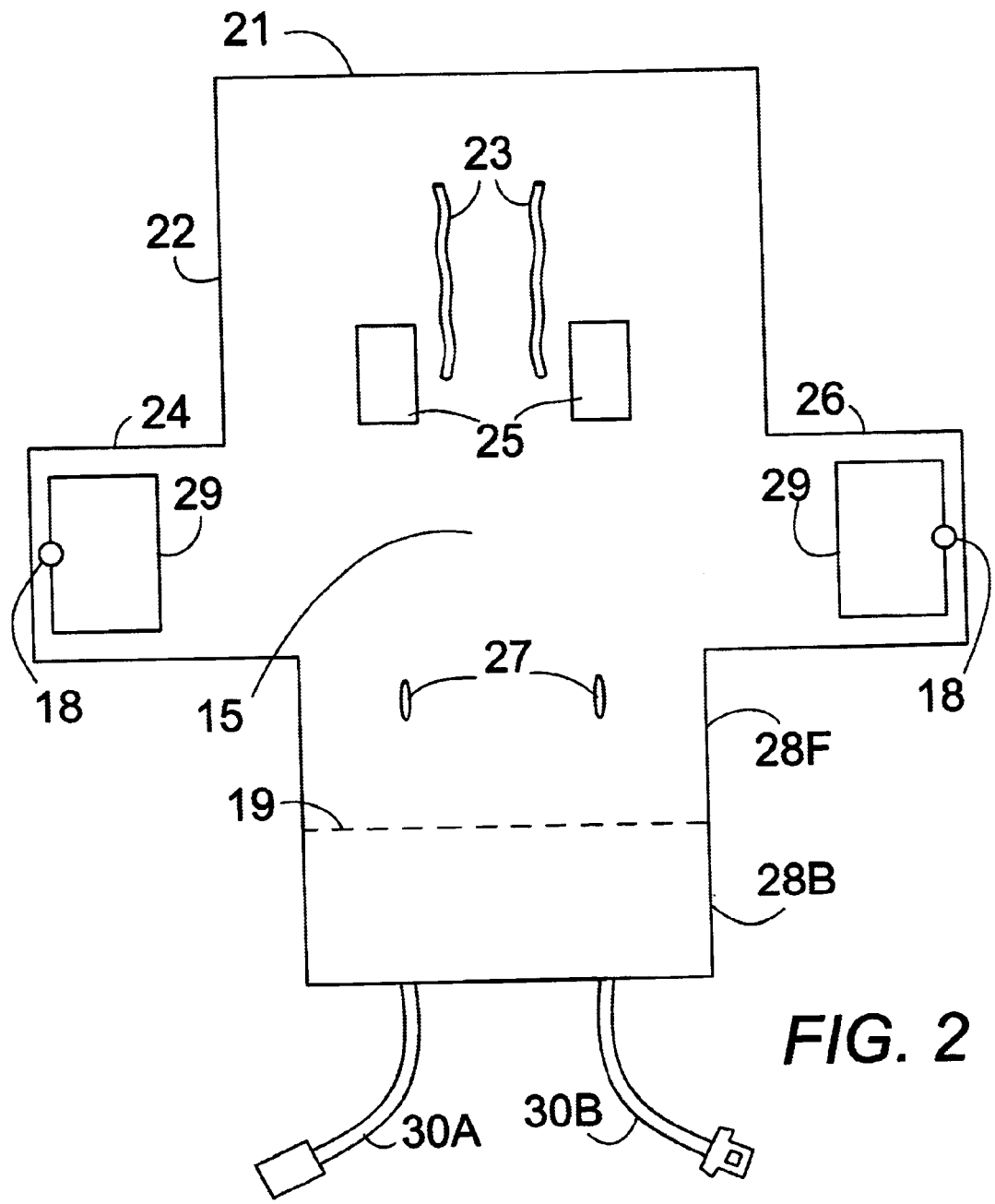
FIG. 2 is a plan view of the front of the cover of FIG. 1.
Figure 3:
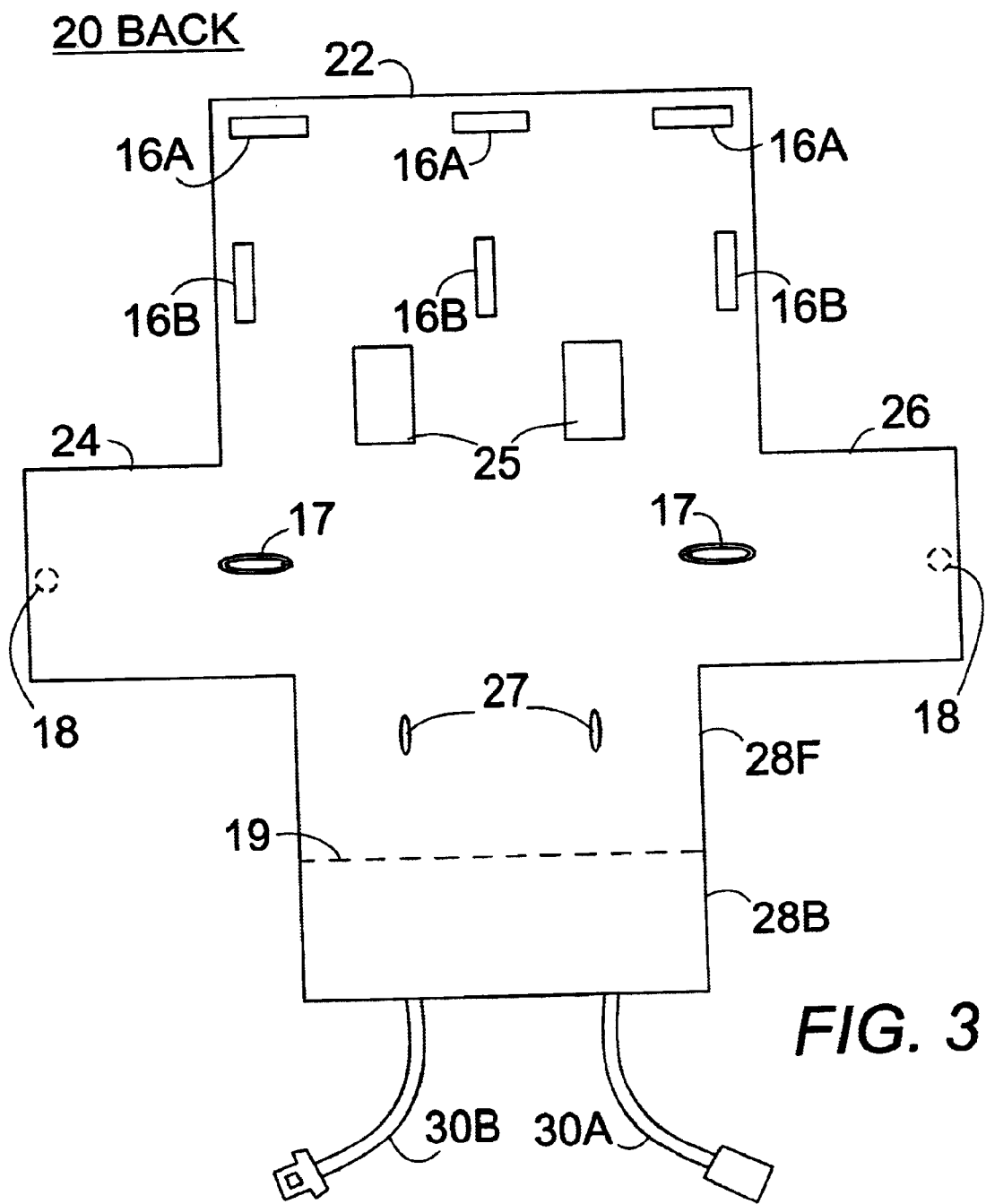
FIG. 3 is a plan view of the back of the cover of FIG. 1.

In FIGS. 1–3, a sanitary cover 20 for a child seat 41 on a shopping type cart 40 which cover 20 provides complete coverage of all parts of the cart 40 which could be contacted by the child in the seat 41, which comprises a planar sheet of fabric 20 having interior padding for comfort.

The sheet 20 has a center bottom seat portion 15 that completely covers the bottom of a shopping type cart 40 child seat 41 and a front cart handle overlap portion 22, which extends from the bottom seat portion 15. The handle overlap portion 22 folds over the handle of a shopping type cart 40 and completely covers the handle and a front portion of the cart child seat 41. The handle overlap portion 22 also has a pair of leg openings 25 aligned with a pair of leg openings of the front portion of the child seat 41 to admit the legs of the child therethrough, as shown in FIG. 1. The handle overlap portion 22 further has an adjustable attaching means for securing an end 21 of the handle overlap portion 22 to an interior of the handle overlap portion 22. The adjustable means for the handle overlap portion 22 comprises a first series of elongated strips 16A of one half of a mating hook and loop fastener means attached to an underside of the cover 20 adjacent to an outer edge 21 of the handle overlap portion 22 with the strips parallel to the edge 21 and a second series 16B of the other mating half of the mating hook and loop fastener means attached to the underside of the cover 20 perpendicular to the edge 21 on an interior of the handle overlap portion 22, as shown in FIG. 3. The edge strips 16A connect to the interior strips 16B at any point along the length of the interior strips 16B to adjust to various sizes of carts 40. The handle overlap portion 22 also has a means for attaching playthings 50 to the handle overlap portion 22, as shown in FIG. 1, to prevent the playthings 50 from dropping. The means for attaching playthings 50 comprises two elasticized or non-elasticized cords 23 which may attach by snaps or sewing or VEL-CRO® or other means.

The sheet 20 further comprises two side cart overlap portions 24 and 26 that extend from the bottom seat portion. Each of the side cart overlap portions 24 and 26 overlap and completely cover all areas of a side portion of the cart child seat 41 that can be touched by a child in the cart seat 41. The side of the cart has a flexible means for attaching an end of the side cart overlap portion to an interior of the side overlap portion. The flexible means for attaching an end of the side cart overlap portion to an interior of the side overlap portion comprises a button means 18 attached to an outer edge of each of the side overlap portions 24 and 26 on a front side of the cover 20, as shown in FIGS. 1 and 2, and an elasticized loop 17 attached to a back side of the cover 20 on an interior of the side overlap portion 24 and 26 spaced from the outer edge, as shown in FIG. 3. When the side overlap portion 24 and 26 overlaps the side of the cart 40, the loop 17 engages the button 18 to secure the side overlap portion 24 and 26 in place, as shown in FIG. 1. Each of the side overlap portions 24 and 26 further comprises a pocket 29 for storage on the front of the cover 20, as shown in FIG. 2.

The sheet 20 also comprises a cart child seat back overlap portion 28F and 28B that extends from the bottom seat portion 15. The back overlap portion 28F and 28B folds over, at a point shown by the dotted line 19 in FIGS. 2 and 3, with the back half 28B completely covering a front half 28F. The back overlap portion 28B has a seat belt 30 which attaches in two interconnectable parts 30A and 30B to an end of the back overlap portion 28B and a pair of seat belt receiving openings 27 or slots like large buttonholes through the front overlap portion 28F. The two portions 30A and 30B of the seat belt 30 each run through an open area of the shopping cart 40 seat back 41 and through one of the seat belt receiving openings 27 in the front half 28F and around the child to hold the child in the cart child seat 41 and retain the back overlap portion 28B and 28F in place, as shown in FIG. 1.

In practice the sanitary cover 20 would be placed inside of the child seat 41 of a shopping cart 40 or similar child seat with the back side of the cover 20, shown in FIG. 3, touching the child seat 41. The leg openings 25 would be lined up with the leg openings provided in the shopping cart 40. The cover 20 would then be secured to the cart 40 by covering the cart 40 handle with the handle overlap portion 22 and securing the first series of elongated strips 16A to the second series of elongated strips 16B, thereby encircling the handle, as shown in FIG. 1.

The cover 20 would be further secured by overlapping each of the side cart overlap portions 24 and 26 over each of the sides of the cart child seat 41, completely covering all areas of a side portion of the cart child seat 41 that can be touched by a child in the cart seat 41. When the side overlap portions 24 and 26 overlap the side of the cart 40, the loop 17 can engage the button 18 to secure the side overlap portion 24 and 26 in place, as shown in FIG. 1.

To totally secure the cover 20, the back overlap portion 28B and 28F is folded over the back of the child seat 41, at a point shown by the dotted line 19 in FIGS. 2 and 3, with the back portion 28B facing the storage area of the shopping cart 40. The back overlap portion 28B and 28F covers a back of the child seat 41. Each of the two portions 30A and 30B of the seat belt 30 would then be fun through an open area of the shopping cart 40 seat back 41 and through one of the seat belt receiving openings 27 in the front back support portion 28F of the cover 20 and buckle around the child to hold the child in the cart child seat 41 and retain the back overlap portion 28B and 28F in place, as shown in FIG. 1.

It is understood that the preceding description is given merely by way of illustration and not in limitation of the invention and that various modifications may be made thereto without departing from the spirit of the invention as claimed.

What is claimed is:

1. A sanitary cover for a child seat on a shopping type cart which cover provides complete coverage of all parts of the cart which could be contacted by the child in the seat, the cover comprising:

a planar sheet of sandwiched fabric having interior padding for comfort, the sheet having a center bottom seat portion adapted for completely covering a bottom of a shopping cart child seat, a front cart handle overlap portion extending from the bottom seat portion, the handle overlap portion adapted for folding over a handle of a shopping type cart and completely covering the handle and a front portion of the cart child seat, the handle overlap portion having a pair of leg openings aligned with a pair of leg openings of the front portion of the cart child seat to admit the legs of the child therethrough, the handle overlap portion having an adjustable attaching means for securing an end of the handle overlap portion to an interior of the handle overlap portion, two side cart overlap portions extending from the bottom seat portion, each of the side cart overlap portions adapted for overlapping and completely covering all areas of a side portion of the cart child seat capable of being touched by a child in the cart seat, each of the side cart overlap portions having a flexible means for attaching an end of the side cart overlap portion to an interior of the side overlap portion, a cart child seat back overlap portion extending from the bottom seat portion, the back overlap portion adapted for folding over and completely covering a back rest portion of the cart child seat, the back overlap portion having a seat belt permanently attached in two interconnectable parts to an end of the back overlap portion extending from the end and a pair of seat belt receiving openings through the back overlap portion in alignment with a waist area of a child in the child seat, the end of the back overlap portion extending down a back of the child seat so that the end of the back overlap portion aligns with the pair of seat belt receiving openings, the two portions of the seat belt each adapted for running through an open area of the shopping cart seat back and through one of the seat belt receiving openings in the back support portion of the cover and the two portions of the seat belt adapted to be interconnected by a buckle means around the child to hold the child in the cart child seat and retain the back overlap portion secured to a back of the cart child seat for holding the back overlay portion in place so that the seat belt secures the back overlap portion of the cover and the child to the seat in the shopping cart.

2. The cover of claim 1 wherein the handle overlap portion further comprises a means for attaching playthings to the handle overlap portion to prevent the playthings from dropping.

3. The cover of claim 1 wherein the adjustable means for the handle overlap portion comprises a first series of elongated strips of one half of a mating book and loop fastener means attached to an underside of the cover adjacent to an outer edge of the handle overlap portion with the strips parallel to the edge and a second series of the other mating half of the mating hook and loop fastener means attached to the underside of the cover perpendicular to the edge on an interior of the handle overlap portion, the edge strips adapted for connecting to the interior strips at any point along the length of the interior strips to adjust to various sizes of carts.

4. The cover of claim 1, wherein the flexible means for attaching an end of the side cart overlap portion to an interior of the side overlap portion comprises a button means attached to an outer edge of each of the side overlap portions on a front side of the cover and an elasticized loop attached to a back side of the cover on an interior of the side overlap portion spaced from the outer edge so that with the side overlap portion overlapping the side of the cart, the loop is adapted for engaging the button means to secure the side overlap portion in place.

5. The cover of claim 1 wherein each of the side overlap portions further comprises a pocket for storage on the front of the cover.

* * * * *